INVENTOR
Francisco Skufca
BY Alvin Browdy
ATTORNEY

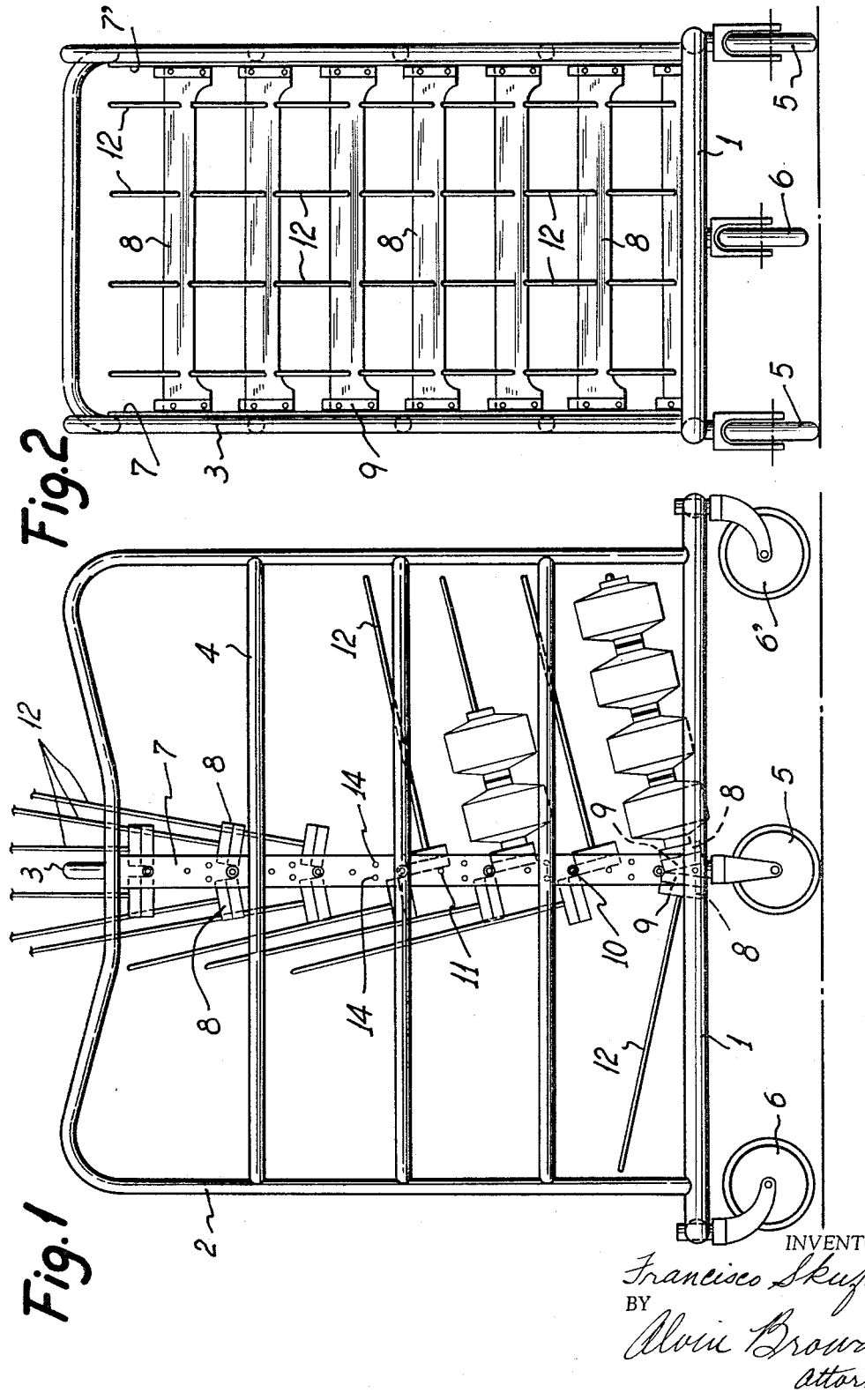

United States Patent Office 3,297,276
Patented Jan. 10, 1967

3,297,276
TRANSPORTER TRUCK FOR INDUSTRIAL ESTABLISHMENTS
Francisco Skufca, 953 Uspallata St., Buenos Aires, Argentina
Filed Dec. 18, 1964, Ser. No. 419,296
12 Claims. (Cl. 242—131)

The present invention refers to a transporter truck with movable supporting or carrying elements, for use in industrial establishments.

Many industrial plants have insufficient floor space to permit the installation of conveyor belts for transporting goods that therefore have to be collected and moved by hand. As an example, the empty and loaded spools, bobbins, etc., in the textile industry often have to be transported in boxes that have to be filled and unloaded by hand and, in many cases, even have to be piled on the ground in stacks, thus necessitating a great deal of handling and incurring the risk of spreading or soiling the yarn. This problem is still more serious today than formerly, as the synthetic yarns and fibers now used are more difficult to keep clean and all possibility of soiling has to be scrupulously avoided.

A similar situation appears in the pharmaceutical and cosmetics industries, where a large number of small containers has to be transported in the processes of cleaning, sterilizing, filling and packing. These containers, after being cleaned, are generally transported on trays which latter are then piled upon each other on trolleys, all of which results in loss of time and the risk of the goods becoming soiled. The process of sterilization of the said containers means a further handling into and out of the sterilizing chambers, followed by additional transportation to the filling machines and finally to the labelling and packing locations.

These considerations give birth to the idea of designing a new and improved transporter truck that can be rapidly and hygienically loaded and unloaded and that has all the advantages arising from these conditions in all operations of transport during manufacture.

The new truck for industrial establishments is characterized by consisting of a tubular framework, preferably of rectangular shape, provided with four wheels, each of the longer sides whereof bears at least one upright, fixed at the center portion, said uprights bearing a plurality of hinged strips that form the supports of the carrying elements attached to one of their surfaces, the said uprights being provided with stop means for limiting the downward inclination of said strips to the exact extent required for loading or unloading the goods on the said carrying elements, and said uprights being provided furthermore with adequate retaining means for maintaining said carrying elements in substantially vertical position when inoperative.

A preferred embodiment of the transporter truck, intended for the transportation of spools and bobbins in the textile industry, will be described in this specification, the said description being illustrated in the attached drawings in which:

FIG. 1 is a vertical longitudinal section of the new truck.

FIG. 2 is a vertical cross-section of same.

Figure 3:
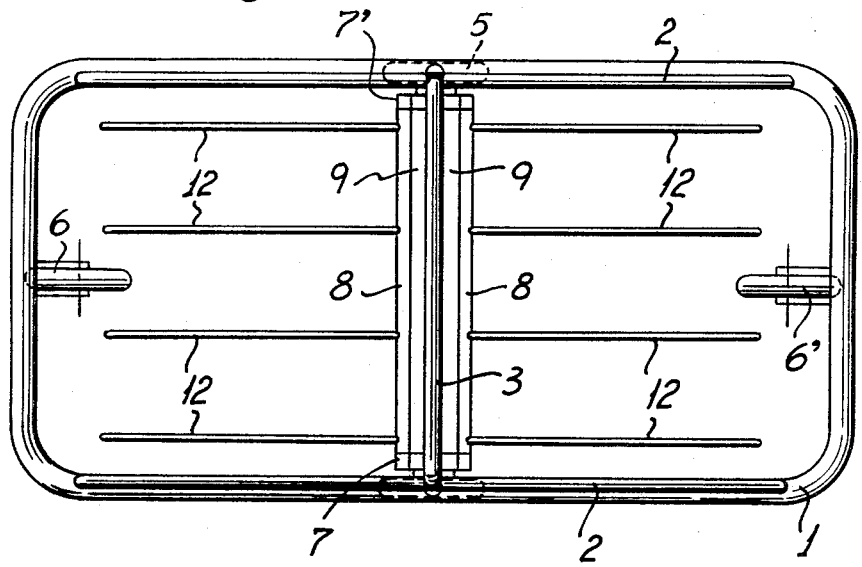
FIG. 3 is a plan of same.

The new truck consists of a four-sided framework 1, preferably of rectangular shape, upon each of the longer sides whereof at least one upright frame 2 is fixed. Another upright frame 3 is fixed at the center of each of the shorter sides of the horizontal framework 1. The two upright frames 2 may be united by means of crossbars 4 to reinforce the whole structure. All these elements of construction are preferably of metal, steel tubes having been found to give the most satisfactory results both in strength and economy. This form of construction is also the most suitable for use in industries where the goods have to be inserted and removed from sterilizing chambers, as is the case in the pharmaceutical industry.

The truck is fitted on four wheels. One pair of these 5 has bearings that are fixed upon the center part of the longer sides of the base frame 1. The bearings of these two wheels 5 are fixed and are longer than the bearings of the other pair of wheels 6, 6'. These latter 6, 6' are swivelled in vertical bearings attached to the shorter sides of the truck frame 1, i.e., one wheel at the center of the front and one at the back end of the truck.

These two swivelled wheels 6, 6' being fixed in shorter bearings than the fixed wheels 5, oblige the truck to be supported upon two or three wheels at all times and enable same to be inclined to the front or rear and thereby facilitate maneuverability.

Two uprights 7, 7' are fixed upon the transverse frame 3 and these uprights support the articulated strips that bear the carrying elements 12 shown in the drawings as suitable for carrying bobbins.

Figure 4:
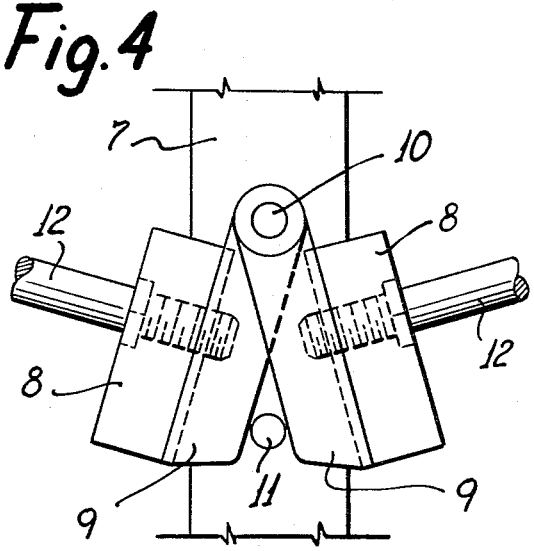
FIG. 4 shows a detail (on a larger scale) of the manner in which the carrying elements are supported by the hinged strips.

The strips 8 are disposed horizontally in pairs, said pairs being freely articulated in respect to each other and supported by hinges 9 upon the uprights 7 as shown in FIG. 4. The two hinges 9 of one pair of adjacent strips 8 articulate upon the same stud 10 but are independent of each other. Below said stud 10 there is a fixed stud 11 that limits the angle of inclination of the strips 8 to the required position of the carrying elements 12.

Each of the strips 8 is provided with a plurality of carrying elements 12, herein shown as consisting of rods or pins, fixed to the upper surface of the said strips 8 and suitably adapted for carrying bobbins, reels or cops 13 to be transported as shown in FIG. 1. When these bobbins 13 are to be threaded upon, or removed from, their respective carrying elements 12, the corresponding strip 8 is inclined so that the rods 12 assume the required position.

The stop stud 11 limits the angle of inclination at the position in which the bobbins 13 can be loaded or removed with the greatest of ease and without the risk of being dropped or becoming soiled when the truck is being moved about.

When the carrying elements 12 are not in actual use, they are retained in the vertical position and this is maintained by means of the removable stop studs 14, fitting into suitably disposed holes in the upright 7.

It will be evident from this description that the new truck can be loaded so as to carry a considerable number of bobbins at a time and that, even when fully loaded, the truck lends itself to be handled easily by one operative without risking any untoward movement or spoiling of the goods while being transported.

When the truck of this invention is adapted for transporting flasks or other containers, the carrying elements fixed on the strips 8 consist of trays or grids upon which the containers are disposed. The angle of inclination adopted by the strips 8 is adjustable and the trays can be maintained in the horizontal position just as the rods 12 hold the bobbins in the vertical position.

It is understood that certain modifications in the details of this invention can be introduced without thereby affecting the true scope of same, as defined in the following claims.

What I claim is:

1. A transporter truck for industrial establishments, consisting of a tubular framework, preferably of rectangular shape, mounted upon wheels, a pair of upright struts fixed upon the center part of the longer sides of the base, a plurality of pairs of horizontal strips supported by said upright struts and carried by hinges, each axis of articulation carrying two hinges and each hinge supporting one of the strips, the two strips hinged on the same axis being disposed divergently and being movable independently of each other, carrying elements for the goods to be transported fixed on one face of the said hinged strips, abutment means provided on the upright struts adapted to limit the downwardly inclined movement of said strips with their carrying elements to the required angle of inclination for loading and unloading, and a set of locking means provided on the said upright struts for securing the strips and their carrying elements in their inoperative position.

2. A transporter truck according to claim 1, in which the abutment means consist of adjustable elements, such as sliding bolts.

3. A transporter truck according to claim 1, in which the locking means consist of adjustable elements such as sliding bolts.

4. A transporter truck for industrial establishments, consisting of a tubular framework, preferably of rectangular shape, mounted upon four wheels, two of which are fixed and two being swivelled, the fixed pair having bearings attached at the center part of the longer sides of the base, while the swivelled wheels have their bearings attached at the center of each of the remaining sides of the base frame, a pair of upright struts fixed to the base in the same vertical plane as that of the pair of fixed wheels, a plurality of pairs of horizontal strips supported by said upright struts and carried by hinges, each axis of articulation carrying two hinges and each hinge supporting one of the strips, the two strips hinged on the same axis being disposed divergently and being movable independently of each other, carrying elements for the goods to be transported fixed on one face of the said hinged strips, abutment means provided on the upright struts adapted to limit the downwardly inclined movement of said strips with their carrying elements to the required angle of inclination for loading and unloading, and a set of locking means provided on the said upright struts for securing the strips and their carrying elements in their inoperative position.

5. A transporter truck for industrial establishments, consisting of a tubular framework, preferably of rectangular shape, mounted upon four wheels, two of which are fixed and two being swivelled, the fixed pair having bearings attached at the center part of the longer sides of the base, while the swivelled wheels have their bearings attached at the center of each of the remaining sides of the base frame, the bearings of the fixed wheels being longer than those of the swivelled wheels, a pair of upright struts fixed to the base in the same vertical plane as that of the pair of fixed wheels, a plurality of pairs of horizontal strips supported by said upright struts and carried by hinges, each axis of articulation carrying two hinges and each hinge supporting one of the strips, the two strips hinged on the same axis being disposed divergently and being movable independently of each other, carrying elements for the goods to be transported fixed on one face of the said hinged strips, abutment means provided on the upright struts adapted to limit the downwardly inclined movement of said strips with their carrying elements to the required angle of inclination for loading and unloading, and a set of locking means provided on the said upright struts for securing the strips and their carrying elements in their inoperative position.

6. A transporter truck for industrial establishments, which consists of a chassis comprising a rectangular framework with a horizontal base, mounted upon four wheels, the longer sides of the base bearing at least two upright frames and at least one transverse frame fixed across the said base frame, a pair of upright struts fixed upon the center part of the longer sides of the base, preferably placed in the same vertical plane as that of the transverse frame and joined to the same, a plurality of pairs of horizontally hinged strips supported by said upright struts, carrying elements for the goods to be transported fixed on one face of the said hinged strips, abutment means provided on the upright struts adapted to limit the downwardly inclined movement of said strips with their carrying elements to the required angle of inclination for loading and unloading, and a set of locking means provided on the said upright struts for securing the strips and their carrying elements in their inoperative position.

7. A transporter truck, particularly useful in the textile industry for transporting cones, bobbins, reels, spools and the like, which consists of a chassis comprising a rectangular framework with a horizontal base, mounted upon four wheels, two of which are fixed and two being swivelled, the fixed pair having bearings attached at the center part of the longer sides of the base, while the swivelled wheels have their bearings attached at the center part of each of the remaining sides of the base frame, the longer sides of the base bearing at least two upright frames and at least one transverse frame fixed across the said base frame, a pair of upright struts fixed to the base frame in the same vertical plane as the pair of fixed wheels and the said transverse frame and joined to the latter, a plurality of pairs of horizontal strips supported by said upright struts and carried by hinges, each axis of articulation carrying two hinges and each hinge supporting one of the strips, the two strips hinged on the same axis being disposed divergently and being movable independently of each other, a plurality of rods adapted to receive said cones, bobbins, reels, spools and the like, fixed in a row on one face of each hinged strip, abutment means provided on the upright struts adapted to limit the downwardly inclined movement of said strips with their rods to the required angle of inclination for loading and unloading, and a set of locking means provided on the said upright struts for securing the rods in their inoperative, substantially vertical position.

8. A transporter truck according to claim 7, in which the bearings of the fixed wheels are longer than those of the swivelled wheels.

9. A transporter truck, particularly useful in the pharmaceutical and cosmetics industry for transporting small containers, such as flasks, jars, and the like, which consists of a chassis comprising a rectangular framework with a horizontal base, mounted upon four wheels, two of which are fixed and two being swivelled, the fixed pair having bearings attached at the center part of the longer sides of the base, while the swivelled wheels have their bearings attached at the center of each of the remaining sides of the base frame, the longer sides of the base bearing at least two upright frames and at least one transverse frame fixed across the said base frame, a pair of upright struts fixed to the base frame in the same vertical plane as the pair of fixed wheels and the said transverse frame and joined to the latter, a plurality of pairs of horizontal strips supported by said upright struts and carried by hinges, each axis of articulation carrying two hinges and each hinge supporting one of the strips, the two strips hinged on the same axis being disposed divergently and being movable independently of each other, horizontal trays adapted to receive containers attached to one face of the said hinged strips, abutment means provided on the upright struts adapted to limit the downwardly inclined movement of said strips with their trays to the required angle of inclination for loading and unloading, and a set of locking means provided on the said upright struts for securing the trays in their inoperative, substantially horizontal position.

10. A transporter truck according to claim 9, in which the bearings of the fixed wheels are longer than those of the swivelled wheels.

11. A transporter truck, particularly useful in the pharmaceutical and cosmetics industry for transporting small containers, such as flasks, jars, and the like, which consists of a chassis comprising a rectangular framework with a horizontal base, mounted upon four wheels, two of which are fixed and two being swivelled, the fixed pair having bearings attached at the center part of the longer sides of the base, while the swivelled wheels have their bearings attached at the center of each of the remaining sides of the base frame, the longer sides of the base bear at least two upright frames and at least one transverse frame fixed across the said base frame, a pair of upright struts fixed to the base frame in the same vertical plane as the pair of fixed wheels and the said transverse frame and joined to the latter, a plurality of pairs of horizontal strips supported by said upright struts and carried by hinges, each axis of articulation carrying two hinges and each hinge supporting one of the strips, the two strips hinged on the same axis being disposed divergently and being movable independently of each other, horizontal trays consisting of perforated plates adapted to receive containers attached to one face of the said hinged strips, abutment means provided on the upright struts adapted to limit the downwardly inclined movement of said strips with their trays to the required angle of inclination for loading and unloading, and a set of locking means provided on the said upright struts for securing the trays in their inoperative, substantially horizontal position.

12. A transporter truck according to claim 11, in which the bearings of the fixed wheels are longer than those of the swivelled wheels.

References Cited by the Examiner
UNITED STATES PATENTS

| | | |
|---|---|---|
| 870,835 | 11/1907 | Loew. |
| 1,051,452 | 1/1913 | Rock. |
| 1,275,983 | 8/1918 | Rasmussen. |
| 1,810,812 | 6/1931 | Beach. |

FOREIGN PATENTS

| | | |
|---|---|---|
| 217,035 | 6/1924 | Great Britain. |

GERALD M. FORLENZA, *Primary Examiner.*

ALBERT J. MAKAY, *Examiner.*